United States Patent
Sugimoto et al.

(10) Patent No.: US 6,478,307 B2
(45) Date of Patent: Nov. 12, 2002

(54) METAL GASKET

(75) Inventors: Kiyoshi Sugimoto, Higashiosaka (JP); Masahiko Miura, Higashiosaka (JP); Kazuya Yoshijima, Toyota (JP)

(73) Assignee: Nippon Gasket Company Ltd., Osaka (JP)

( * ) Notice: Subject to any disclaimer, the term of this patent is extended or adjusted under 35 U.S.C. 154(b) by 0 days.

(21) Appl. No.: 09/739,251

(22) Filed: Dec. 19, 2000

(65) Prior Publication Data

US 2001/0006279 A1 Jul. 5, 2001

(30) Foreign Application Priority Data

Dec. 22, 1999 (JP) .............................................. 11-363885

(51) Int. Cl.[7] .............................................. F02F 11/00
(52) U.S. Cl. ........................ 277/592; 277/593; 277/595
(58) Field of Search ..................................... 277/592–5

(56) References Cited

U.S. PATENT DOCUMENTS

| | | | |
|---|---|---|---|
| 3,549,157 A | | 12/1970 | Bennigsen |
| 3,653,674 A | | 4/1972 | Bennigsen |
| 4,834,399 A | * | 5/1989 | Udagawa et al. |
| 4,976,445 A | * | 12/1990 | Udagawa |
| 4,995,624 A | * | 2/1991 | Udagawa et al. |
| 5,076,595 A | * | 12/1991 | Udagawa |
| 5,348,315 A | * | 9/1994 | Kawaguchi et al. |
| 5,449,181 A | * | 9/1995 | Miyaoh |
| 5,634,646 A | * | 6/1997 | Miyaoh |
| 6,105,971 A | * | 8/2000 | Hasegawa .................... 277/593 |
| 6,113,110 A | * | 9/2000 | Hasegawa .................... 277/593 |
| 6,164,662 A | * | 12/2000 | Uemura et al. ............. 277/593 |
| 6,315,303 B1 | * | 11/2001 | Erb et al. ..................... 277/593 |

FOREIGN PATENT DOCUMENTS

| | | | |
|---|---|---|---|
| JP | 46-43 | | 1/1971 |
| JP | 5-39868 | * | 2/1993 |
| JP | 10-259871 | * | 9/1998 |
| JP | 10-259873 | * | 9/1998 |
| JP | 11-108191 | | 4/1999 |

* cited by examiner

*Primary Examiner*—Anthony Knight
*Assistant Examiner*—Alison K. Pickard
(74) *Attorney, Agent, or Firm*—Rader, Fishman & Grauer PLLC (57) ABSTRACT

A metal gasket is described which has a structure with no beads so that the need for dies used for molding is eliminated, thereby facilitating the processing of the gasket and achieving good cost performance, and which is excellent in sealing ability. The metal gasket comprises (i) an elastic metal plate having a base and folded-back portions each of which is formed so as to create a clearance together with the base and disposed so as to extend around a bore hole and (ii) a metal plate which is thicker than the elastic metal plate and has lower level portions each of which is located at a position closed to each bore hole, and the elastic metal plate and the metal plate are laminated such that each folded-back portion of the elastic metal plate faces the lower level portion of the metal plate.

15 Claims, 7 Drawing Sheets

METAL GASKET

TECHNICAL FIELD

The present invention relates to metal gaskets used for providing seals, for example, between the opposed surfaces of the cylinder block and cylinder head of an engine.

BACKGROUND ART

In various kinds of machines, metal gaskets having a lamination structure composed of elastic metal plates have been used up to now in order to prevent leakage of air, water, oil and others. Prevailing laminated metal gaskets of this type are provided with beads at their sealing regions. Particularly, in laminated metal gaskets for use in engines typical examples of which are cylinder head gaskets and exhaust manifold gaskets, a bead plate, which is produced by forming beads by molding on an elastic metal thin plate made of e.g., SUS301, is used as an outer plate.

There have been recently proposed, in the field of engines, various laminated metal gaskets which can cope with the trends toward making of all engine parts from aluminum alloys and toward high combustion pressure, while they have laminated structures composed of several metal sheets. For instance, Japanese Patent Publication (KOKAI) Gazette No. 11-108191 (1999) discloses a laminated metal gasket having a thick intermediate plate interposed between two bead plates. In this intermediate plate, a stopper portion composed of a plurality of convex and concave portions is formed around a bore hole, thereby to improve the endurance of the stopper function relative to the beads.

Where a bead plate is used at a sealing region, the bead is normally required to have a semi-circular profile having a width of several mm and height of several hundreds $\mu$m, in the case of a full bead. Therefore, there arises such a problem that the bead molding carried out by use of a thin stainless steel plate becomes precision processing and therefore high-level quality control proportionate to the precision processing is required. In addition, use of dies is essential for such bead molding so that the design, manufacture, maintenance, control, design changes of the dies involves a large number of processes as well as high cost from the trial stage to the mass production, which reflects upon the production cost of the bead plate.

The technique disclosed in Japanese Patent Publication (KOKAI) No. 11-108191 does not overcome the limit of the conventional techniques as far as use of bead plates is concerned, so that the above-mentioned cost problem is still left unsolved.

The present invention has been directed to overcoming the foregoing problems and a prime object of the invention is therefore to provide a metal gasket which has a structure having no beads so that dies for molding are no longer necessary, resulting in easy processing and which provides good cost performance and excellent sealing ability.

DISCLOSURE OF THE INVENTION

The above object can be achieved by a metal gasket according to the invention which comprises (i) an elastic metal plate having a base and foldedback portions each of which is formed so as to create a clearance together with the base and disposed so as to extend around a bore hole and (ii) a metal plate thicker than the elastic metal plate, wherein the elastic metal plate and the metal plate are laminated such that the folded-back portions of the elastic metal plate face the metal plate.

According to the invention, each folded-back portion of the elastic metal plate and, more preferably, the convex-shaped portions of each folded-back portion come in contact with each lower level portion of the metal plate, thereby forming and keeping a sealing line. In addition, when the gasket is inserted between the opposed surfaces of a cylinder head and a cylinder block for instance, the folded-back portions can conform to the deformation of the cylinder head and the cylinder block, so that a gasket excellent in sealing ability can be achieved. Further, since beads which require high-precision molding processing are not used but techniques such as partial coating treatment or auxiliary bead formation are properly employed in combination for seal reinforcement, a low-cost, highly reliable gasket can be achieved.

Preferably, the invention is arranged such that the metal plate has each lower level portion at a position close to each bore hole whereas each folded-back portion of the elastic metal plate is so disposed as to face each lower level portion of the metal plate.

Preferably, the height of the folded-back portions of the elastic metal plate is greater than the level difference between the lower level portions and the base of the metal plate. With this arrangement, the folded-back portions can be surely provided with a stopper function so that the folded-back portions have good conformity with respect to the deformation of the cylinder head and the cylinder block, thereby assuring stable bore sealing surface pressure.

In the invention, it is preferable to dispose two such elastic metal plates at opposed positions with the metal plate positioned therebetween. This forms a sealing line at both sides of the metal plate to achieve further improved sealing ability.

Preferably, the outer surface of each lower level portion of the metal plate facing each folded-back portion is provided with an auxiliary bead formed from a soft material, whereas the outer surface of a part of the base of the elastic metal plate is provided with a coating portion formed from a known rubber material, the part facing the folded-back portion. By virtue of this arrangement, the sealing ability of the gasket can be further improved so that severe control for the processing accuracy of the folded-back portions can be alleviated.

In the invention, it is preferable that each folded-back portion of the elastic metal plate is composed of a multiplicity of, for instance, two smooth convex-shaped portions which are continuously formed, projecting in a direction opposite to the base. The provision of the two continuously formed convex-shaped portions allows the clearance formed between the base and the folded-back portion to be left as much as possible, so that a stable double bore sealing line can be formed by the folded-back portion. In addition, if the cylinder head and the cylinder block are deformed where the gasket is interposed between the opposed surfaces of the cylinder head and the cylinder block for instance, the folded-back portions each composed of the two convex-shaped portions conform to the deformation as a stopper portion, so that a contacting condition similar to a line contact can be established at the lower level portions of the metal plate which is the mating face with which the folded-back portions come in contact. As a result, a stable sealing effect can be achieved.

The outer surfaces of the convex-shaped portions of each folded-back portion and/or the outer surface of a part of the base which faces the convex-shaped portions may be partly coated with a known rubber material or respectively provided with an auxiliary bead made from a soft material. By combining these means, the sealing ability of the gasket can be further improved. Additionally, these means are properly used in combination, thereby alleviating severe control for the processing accuracy of the folded-back portions.

BEST MODE FOR CARRYING OUT THE INVENTION

Referring now to the accompanying drawings, metal gaskets will be described according to preferred embodiments of the invention.

Figure 1:
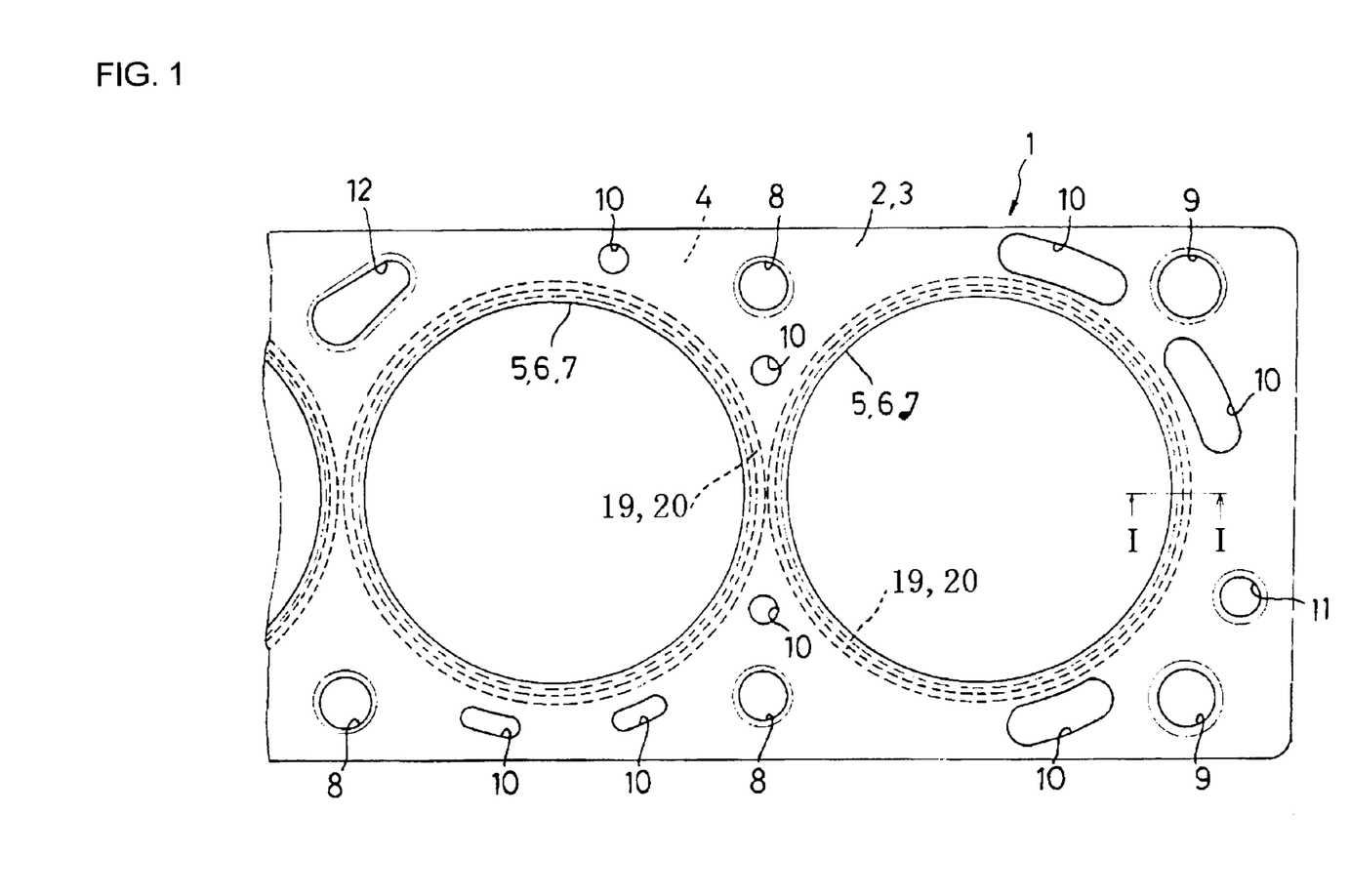
FIG. 1 is a partial plan view of a metal gasket constructed according to one embodiment of the invention.

FIG. 1 is a partial plan view of a metal gasket constructed according to a first embodiment of the invention. FIGS. 2(a) and 2(b) are a sectional view taken along line I—I of FIG. 1 and a sectional view of an elastic metal plate, respectively.

A metal gasket 1 according to a first embodiment is used for providing seals between the opposed clamp faces of a cylinder head and a cylinder block in a multiple cylinder engine. The metal gasket 1 comprises two elastic metal plates 2, 3 and a metal plate 4 interposed as an intermediate plate between the elastic metal plates 2, 3. The elastic metal plates 2, 3 are formed in such a way that a metal piece, which is stamped out of a metal material such as a stainless spring steel plate (e.g., SUS301) having a desired thickness or spring steel having elasticity and processability substantially equal to those of the aforesaid stainless spring steel plate, is subjected to shaping processing such as folding back. The metal plate 4 is formed from a material having elasticity and excellent processability such as steel, alloy steel, stainless spring steel plates (e.g., SUS304).

The elastic metal plates 2, 3 have bore holes 5, 6 respectively, which correspond to a plurality of cylinder bores juxtaposed in the cylinder block. The metal plate 4 is provided with bore holes 7. The elastic metal plates 2, 3 and the metal plate 4 respectively have bolt holes 8, bolt and knock holes 9, water holes 10, oil holes 11 and an oil and bolt hole 12 which are so formed as to pierce through these plates.

As shown in FIG. 2(b), each of the elastic metal plates 2, 3 is comprised of a base 13 and folded-back portions 15 each of which is folded back to the base 13 with a clearance 14 between the folded-back portion 15 and the base 13. Each folded-back portion 15 extends about the entire periphery of the bore hole 5 (6). The profile of each folded-back portion 15 has a first convex curve portion (first convex-shaped portion) 16 of a smooth arc shape which projects in a direction opposite to the base 13 and a second convex curve portion (second convex-shaped portion) 17 of a smooth arc shape which continues from the first convex curve portion 16. As shown in FIG. 2(b), each folded-back portion 15 is formed so as not to touch the base 13 when it is in a free condition. The profile of a concave curve portion 18 formed between the first and second convex curve portions 16, 17 should be designed not to have a sharp edge shape but to have an arc shape which is smooth as much as possible and has a smaller radius of curvature, so that excessive surface pressure is not concentrated on this concave curve portion 18.

The metal plate 4 is thicker than the elastic metal plates 2, 3 and has lower level portions 21, 22 at both faces in a position close to the bore hole 7, the lower level portions 21, 22 continuing from level difference portions 19, 20 respectively. In this embodiment, the profiles of the level difference portions 19, 20 respectively include an inclined line.

When laminating the elastic metal plates 2, 3 and the metal plate 4 having the above structures, the respective folded-back portions 15 of the elastic metal plates 2, 3 are disposed so as to face the lower level portions 21, 22 of the metal plate 4, respectively. To give the folded-back portions 15 a stopper function when the cylinder head and the cylinder block are tightened, the height $t_1$ of the convex-shaped portions 16, 17 is preferably set to be higher than the height $t_2$ of the level difference portions 19, 20 ($t_1 > t_2$).

In the metal gasket 1 of the present embodiment, the two convex-shaped portions (i.e., the first and second convex curve portions 16, 17) formed in each folded-back portion 15 of each of the elastic metal plate 2, 3 form a double bore sealing line around the bore hole. These sealing lines exhibit a stable sealing effect and ensure bore sealing surface pressure even if deformation occurs in the cylinder head and the cylinder block, because the folded-back portions 15 of the elastic metal plates 2, 3 conform to the deformation as a sealing so that contacts similar to line contacts are established on the mating surfaces of the lower level portions 21, 22 with which the folded-back portions 15 come in contact respectively. In this way, annular contact portions maintaining the surface contact condition of the double sealed region are formed around the bore holes 5, 6, 7 which require high sealing performance. As a result, a fluid such as combustion gas passing through the bore holes 5, 6, 7 can be reliably prevented from leaking.

Figure 3:
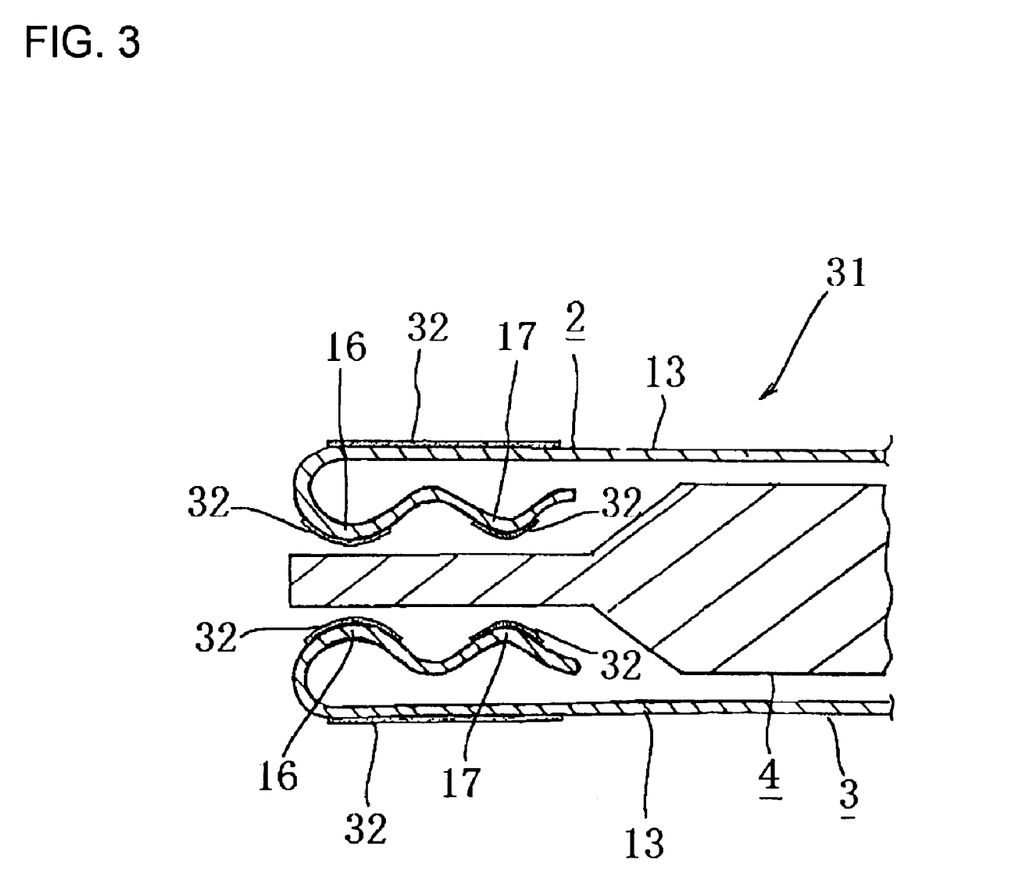
FIG. 3 is a partial sectional view of a metal gasket constructed according to another embodiment.

FIG. 3 shows a partial sectional view of a metal gasket constructed according to a second embodiment of the invention.

A gasket 31 of the second embodiment is obtained by modifying the structure of the first embodiment such that the outer surfaces of the convex-shaped portions 16, 17 and the outer surface of a part of the base 13 in each elastic metal plate are respectively partially coated with a known rubber material, forming coating portions 32. The above part of the base 13 faces the convex-shaped portions 16, 17. The thickness of the coating portions 32 has a normal value, namely, about 30 μm or less. In addition to the seal reinforcement by the convex-shaped portions 16, 17, the provision of the coating portions 32 reinforces the seals on the side of the cylinder head and on the side of the cylinder block, so that the reliability of the seals around the bore holes can be further improved. It should be noted that the material and thickness of the coating material may be arbitrarily selected.

Figure 4:
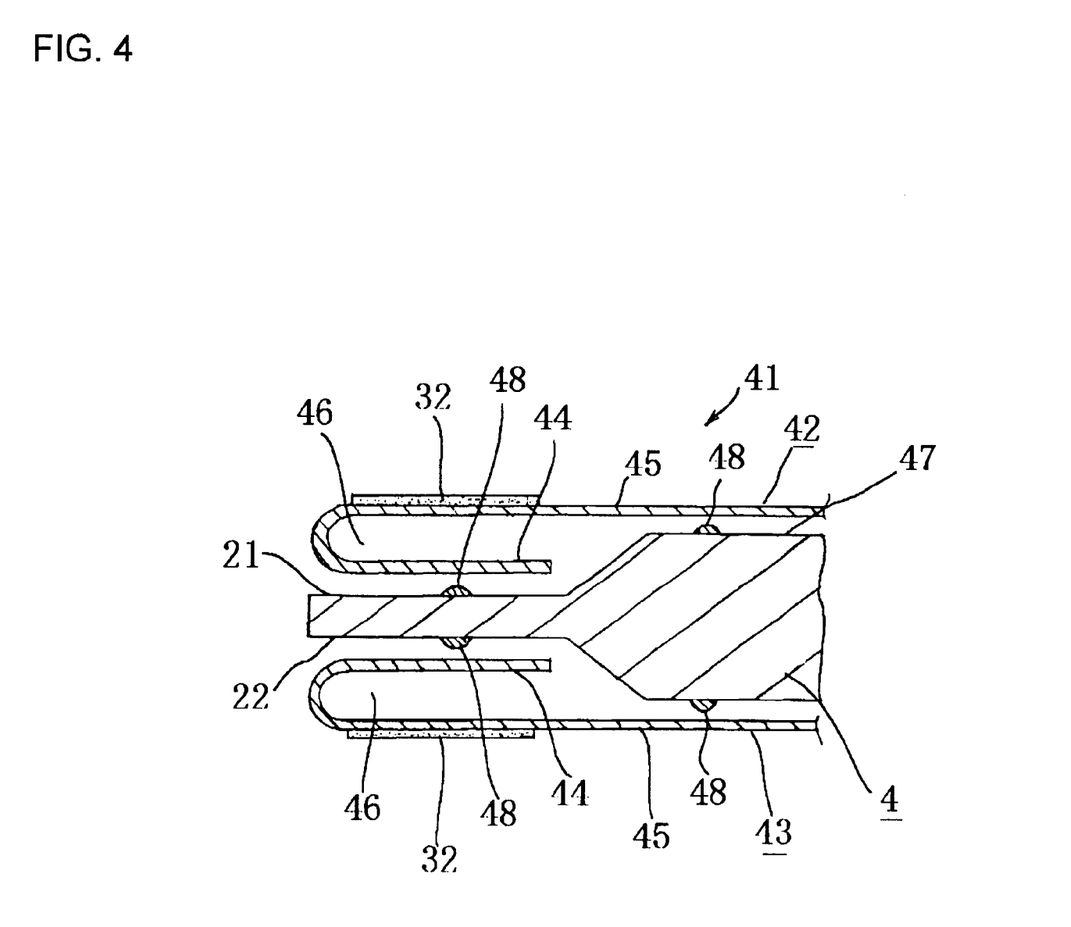
FIG. 4 is a partial sectional view of a metal gasket constructed according to still another embodiment.

FIG. 4 shows a partial plan view of a metal gasket constructed according to a third embodiment of the invention.

In a metal gasket 41 of the third embodiment, folded-back portions 44 of each of elastic meal plates 42, 43 are bent at 180° with respect to a base 45 so as to form a clearance 46. In the metal plate 4, the outer surface of a base 47 and the outer surfaces of the lower level portions 21, 22 are respectively partially provided with an auxiliary bead 48 made from a known soft material. In each of the elastic metal plates 42, 43, the outer surface of a part of the base 45 which faces the folded-back portion 44 is partially coated with a known rubber material to form a coating portion 32. The third embodiment having such a structure is more simplified than the structure of the second embodiment shown in FIG. 3, so that further cost reduction is possible.

Figure 5:
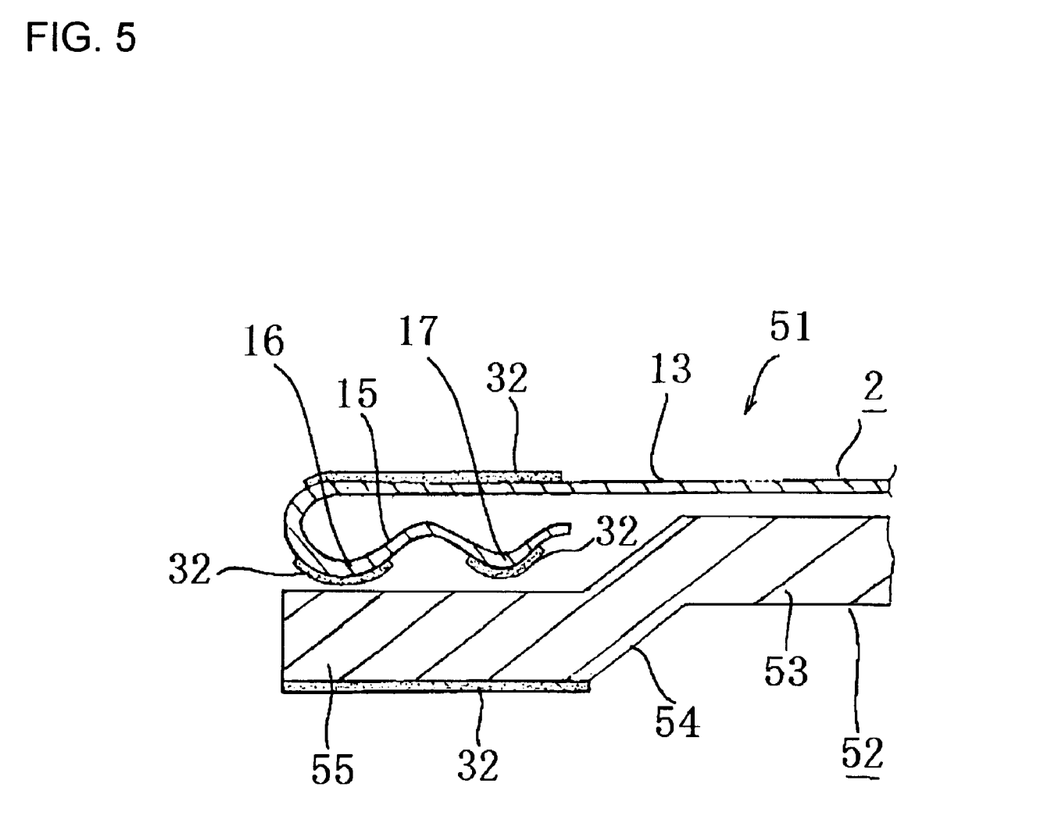
FIG. 5 is a partial sectional view of a metal gasket having a two-plate structure.
Figure 6:
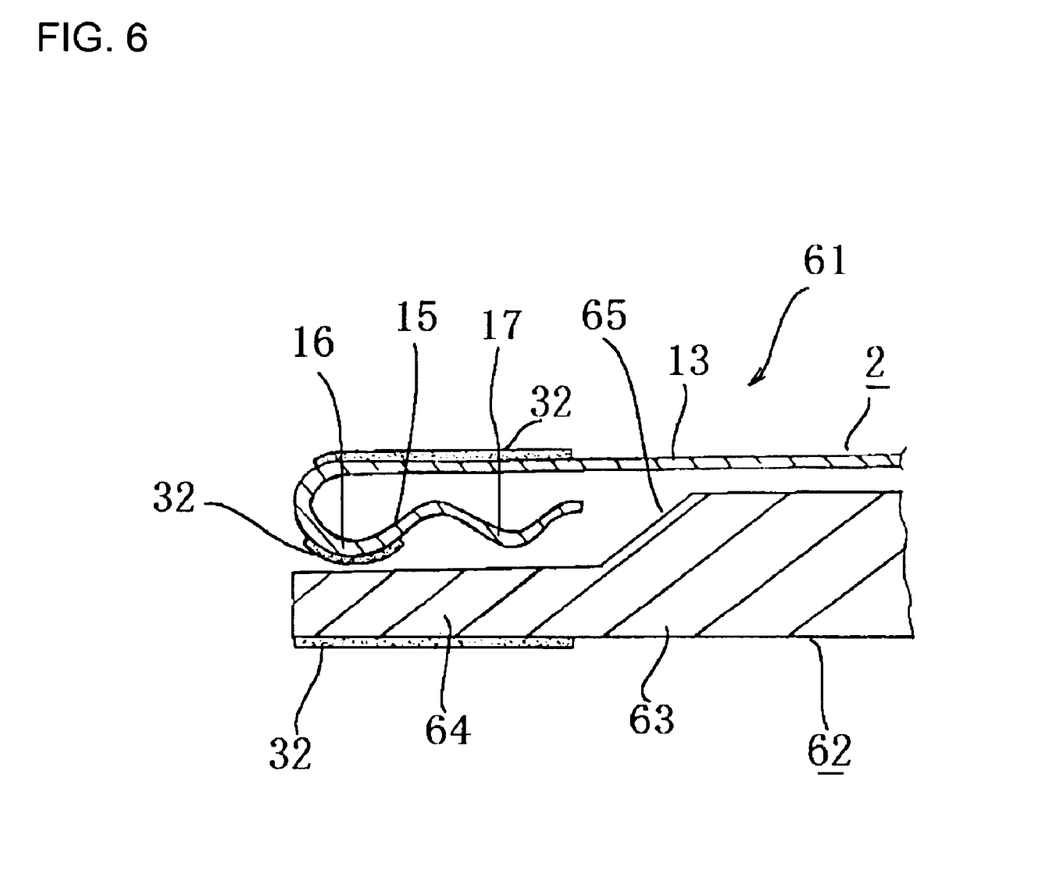
FIG. 6 is a partial sectional view of a metal gasket having a two-plate structure constructed according to another embodiment.

While each embodiment has been described with a gasket of a three-plate structure comprising two elastic metal plates and a metal plate interposed between the elastic metal plates, the invention is also applicable to a gasket of a two-plate structure composed of one elastic metal plate and one metal plate. FIGS. 5 and 6 show embodiments having the two-plate structure.

Figure 2:
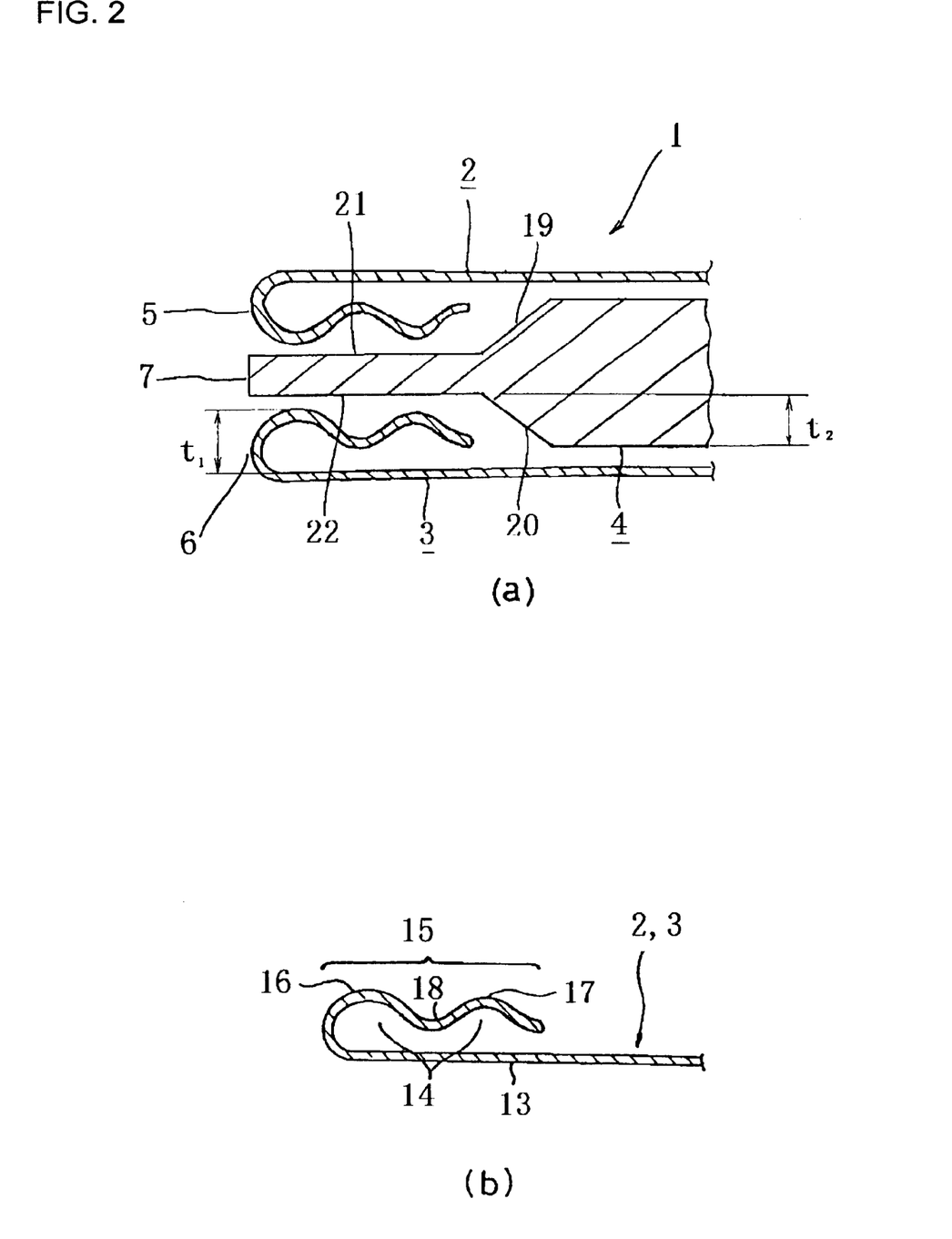
FIG. 2(a) is a sectional view taken along line I—I of FIG. 1.
FIG. 2(b) is an enlarged view showing a fundamental part of an elastic metal plate.

In the fourth embodiment shown in FIG. 5, a metal gasket 51 has a two-plate structure which comprises the elastic metal plate 2 having the folded-back portions 15 each composed of two continuously formed convex-part portions like the embodiments of FIGS. 2, 3 and a metal plate 52 disposed so as to face the folded-back portions 15 of the elastic metal plate 2. The metal plate 52 is thicker than the elastic metal plate 2 and has lower level portions 55 each of which is formed at a position close to the bore hole 7 so as to continue from a base 53 through a level difference portion 54 and which has the substantially same thickness as the base 53. The outer surfaces of the convex-shaped portions 16, 17 and the outer surface of a part of the base 13 are respectively partially coated with a rubber material to form the coating portions 32, the above part facing the convex-shaped portions 16, 17. The provision of the convex-shaped portions 16, 17 in combination with the coating material further enhances the sealing ability.

In the fourth embodiment, it is preferable in view of corrosion resistance to use a stainless spring steel plate such as SUS 304 as the material of the metal plate 52, but aluminum alloys having the same characteristics as those of the stainless spring steel plate may be used.

FIG. 6 shows a fifth embodiment which differs from the fourth embodiment shown in FIG. 5 in the construction of the level difference portions and in the arrangement of the coating portion. Specifically, a metal gasket 61 of the fifth embodiment is designed such that in a metal plate 62, each level difference portion 65 is so configured that each lower level portion 64 is thinner than a base 63. In contrast with the fourth embodiment shown in FIG. 5, the outer surface of the convex-shaped portion 17 of the fifth embodiment is not provided with the coating portion 32. With this arrangement, the substantially same effect as obtained by the fourth embodiment shown in FIG. 5 can be achieved by the fifth embodiment.

Although the first and second convex curve portions 16, 17 formed in the folded-back portion of the elastic metal plate have the substantially same arc curve shape in each of the foregoing embodiments, various modifications are possible for the shapes of the convex curve portions. FIGS. 7(a) to 7(e) show the modifications of the shapes.

Figure 7:
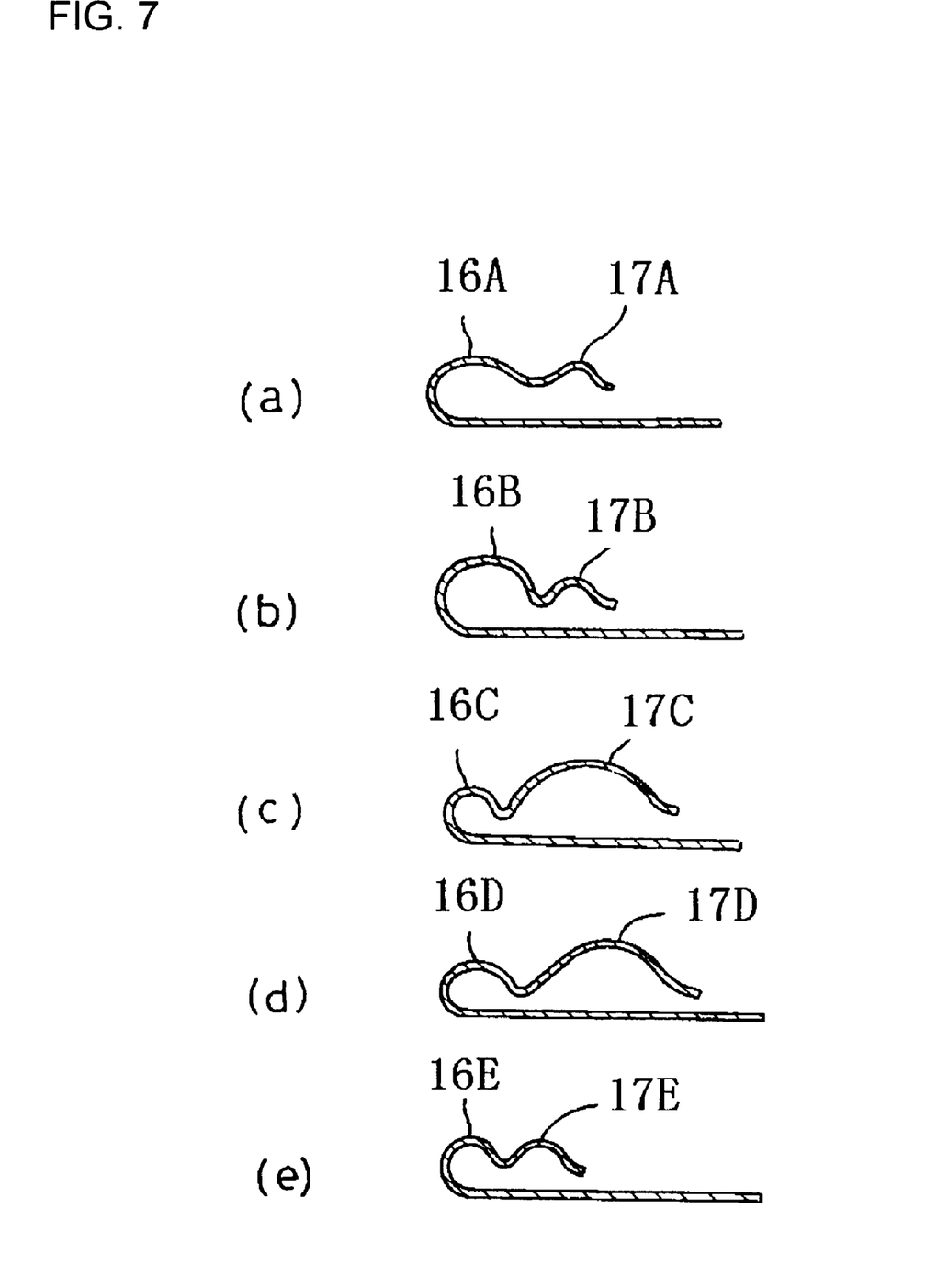
FIGS. 7(a) to 7(e) are sectional views showing modifications of the shape of an elastic metal plate.

FIG. 7(a) shows an example in which a first convex curve portion 16A has an oval shape while a second convex curve portion 17A has a small circular shape, and the heights of the first and second convex curve portions 16A, 17A from the base are the same. FIG. 7(b) shows an example in which a first convex curve portion 16B has a large circular shape while a second convex curve portion 17B has a small circular shape. FIG. 7(c) shows an example in which a first convex curve portion 16C. has a small circular shape while a second convex curve portion 17C has a large oval shape. FIG. 7(d) shows an example in which a first convex curve portion 16D has a small oval shape while a second convex curve portion 17D has a large oval shape. FIG. 7(e) shows an example in which a first convex curve portion 16E and a second convex curve portion 17E are in the form of a small circle and have the same height from the base. The same effect as that of the foregoing embodiments can be expected by employing any of these shapes.

In each of the foregoing embodiments, the materials of the elastic metal plate and the metal plate are not limited to those mentioned earlier but their examples may include aluminum alloys, titan-aluminum alloys and similar metal materials. These materials may be arbitrarily selected in combination.

While each of the forgoing embodiments has been described with the level difference portions of the metal plate having a profile including an inclined line, the level difference portions may have a profile having a line that is at right angles to the base.

In each of the foregoing embodiments, each folded-back portion has a profile composed of two convex curve portions which are continuously formed. However, the number of convex curve portions is not limited to two but a profile having three or more continuously formed convex curve portions may be employed. Additionally, a known means for respectively filling the clearances 14, 46 with an elastic spring, soft material member or the like may be used in combination.

What is claimed is:

1. A metal gasket which comprises (i) an elastic metal plate having a base and folded-back portions each of which is formed so as to create a clearance together with the base and disposed so as to extend around a bore hole and (ii) a metal plate thicker than the elastic metal plate, wherein the elastic metal plate and the metal plate are laminated such that the folded-back portions of the elastic metal plate face the metal plate and said metal plate has a stepped-down portion located at a position close to each bore hole, and defining respective recesses into the metal plate, and each folded-back portion of the elastic metal plate is so disposed as to be received by the respective recess and to face each stepped-down portion of the metal plate, wherein each stepped-down portion has a thickness less than a remainder of the metal plate.

2. A metal gasket according to claim 1, wherein the height of the folded-back portions is greater than the level difference between the stepped-down portions and the remainder of the metal plate.

3. A metal gasket according to any one of claims 1 or 2, wherein two said elastic metal plates are disposed at opposed positions with the metal plate positioned therebetween.

4. A metal gasket according to claim 1 or 2, wherein the outer surface of each lower level portion of the metal plate facing each folded-back portion is provided with at least one auxiliary bead, whereas the outer surface of a part of the base of the elastic metal plate is provided with at least one coating portion, the part of the base of the elastic metal plate facing each folded-back portion.

5. A metal gasket according to any one of claims 1 or 2, wherein each folded-back portion of the elastic metal plate is composed of a multiplicity of smooth convex-shaped portions which are continuously formed, projecting in a direction opposite to the base.

6. A metal gasket according to claim 5, wherein at least one of the outer surfaces of the convex-shaped portions of each folded-back portion and the outer surface of a part of the base are respectively partly coated with a coating portion.

7. A gasket member according to claim 1, wherein each folded-back portion includes at least one arc shaped segment as viewed in cross-section.

8. A gasket member according to claim 1, wherein each folded-back portion is formed in cross-section as a sinusoidal configuration defining at least two arc shaped segments.

9. A gasket member according to claim 1, wherein each folded-back portion includes at least one arc shaped segment as viewed in cross-section and oriented in a facially opposing relationship with respective stepped-down portions of the metal plate.

10. A gasket member, comprising:
a metal plate having an annular stepped-down portion formed in a surface thereof to define a recess and a bore hole extending through the metal plate centrally of the stepped down portion wherein the stepped-down portion has a thickness less than a remainder of the metal plate, and
an elastic metal plate having a base with an inner periphery to define a through hole sized substantially equally to the bore hole and a folded-back portion connected to the inner periphery, extending radially outwardly therefrom and defining a clearance between the base and the folded-back portion, the folded-back portion extending circumferentially about the through hole, the metal plate and the elastic metal plate laminated to each other in a manner that the folded-back portion is received into the recess to facially oppose the stepped down portion and the bore hole and the through hole being in coaxial alignment with each other.

11. A gasket member according to claim 10, wherein the folded-back portion and the base are disposed apart from one another at a first height and the stepped-down portion and the surface of the metal plate are disposed apart from one another at a second height, the first height being greater than the second height.

12. A gasket member according to claim 11, wherein each folded-back portion includes at least one arc shaped segment.

13. A gasket member according to claim 11, wherein each folded-back portion is formed in cross-section as a sinusoidal configuration defining at least two arc shaped segments.

14. A gasket member according to claim 10, further comprising a bead connected to and projecting from the stepped-down portion, the bead extending concentrically about the bore hole.

15. A gasket member according to claim 10, further comprising a coating applied to at least one of the folded-back portion and an outer surface of the base adjacent the through hole.

* * * * *